US006315109B1

(12) United States Patent
Dean

(10) Patent No.: US 6,315,109 B1
(45) Date of Patent: Nov. 13, 2001

(54) SPLIT ROLLER WHEEL AND METHOD OF ASSEMBLY

(75) Inventor: William C. Dean, Houston, TX (US)

(73) Assignee: Stewart & Stephenson Services, Inc., Houston, TX (US)

( * ) Notice: Subject to any disclaimer, the term of this patent is extended or adjusted under 35 U.S.C. 154(b) by 0 days.

(21) Appl. No.: 09/301,984

(22) Filed: Apr. 29, 1999

Related U.S. Application Data

(60) Provisional application No. 60/083,607, filed on Apr. 30, 1998, provisional application No. 60/083,610, filed on Apr. 30, 1998, provisional application No. 60/083,666, filed on Apr. 30, 1998, and provisional application No. 60/083,668, filed on Apr. 30, 1998.

(51) Int. Cl.$^7$ .................................................. B65G 13/02
(52) U.S. Cl. .................................. 198/786; 193/35 MD; 414/529
(58) Field of Search ................. 193/35 MD; 198/370.09, 198/786, 842; 414/345, 347, 529

(56) References Cited

U.S. PATENT DOCUMENTS

| D. 309,254 | * | 7/1990 | Guile . | |
|---|---|---|---|---|
| D. 318,791 | * | 8/1991 | Guile . | |
| 1,305,535 | * | 6/1919 | Grabowiecki . | |
| 3,465,843 | * | 9/1969 | Guinot . | |
| 3,657,779 | * | 4/1972 | Granberry | 198/842 |
| 3,710,917 | * | 1/1973 | Black et al. | 193/35 MD |
| 4,223,753 | * | 9/1980 | Bradbury . | |
| 5,367,352 | * | 11/1994 | Schulz-Lekies | 193/35 MD |
| 5,396,977 | | 3/1995 | Lantis et al. . | |

FOREIGN PATENT DOCUMENTS

264111  *  11/1987  (JP) ................................ 193/35 MD

* cited by examiner

*Primary Examiner*—Joseph E. Valenza
(74) *Attorney, Agent, or Firm*—Browning Bushman, P.C.

(57) ABSTRACT

A split roller 150 may be removed from an axle 104 without requiring access to the axle end. A split wheel hub 152 supports a plurality of peripheral rollers 180, which may be arranged in two rows spaced along the hub axis. In a preferred embodiment, the wheel hub comprises two asymmetric hub halves 134, 136 which are fastened together around an axle. Each roller in the second row may be spaced circumferentially between a pair of rollers in the first row. According to the method of the invention, the hub halves are assembled, preferably with some rollers in each of the first and second rows already mounted thereon. Other rollers in each row are then mounted to the assembled hub halves.

10 Claims, 7 Drawing Sheets

SPLIT ROLLER WHEEL AND METHOD OF ASSEMBLY

CROSS-REFERENCE TO RELATED APPLICATIONS

The present invention relates to inventions disclosed in copending applications entitled Aircraft Cargo Loader With Multi-Center Platform Deck, Ser. No. 60/083,607 Aircraft Cargo Loader With Quick-Release Lift-Assisted Handrail, Ser. No. 60/083,610, and Aircraft Cargo Loader With Platform Leveling System, Ser. No. 60/083,666, all of which were filed concurrently with the priority provisional application Ser. No. 60/083,668.

FIELD OF THE INVENTION

The present invention relates to roller wheels of the type used to laterally move goods on a platform. Such roller wheels may be used in mobile loaders that incorporate at least one variable height platform, wherein a roller wheel is mounted on a shaft which may be selectively powered. Mobile loaders of this type are commonly used for loading and unloading freight in the cargo holds of aircraft. Still more particularly, the present invention relates to a split roller wheel that may be mounted on and removed from an axle without requiring access to the axle end.

BACKGROUND OF THE INVENTION

Mobile loaders are essential equipment for the loading and unloading of containerized and palletized cargo into and from the holds of aircraft. Such loaders often employ two platforms. One platform, usually referred to as the bridge, provides an interface with the sill of the cargo door. The bridge is supported on a hydraulic lift, which provides a high degree of control and stability and allows the height of the bridge to be adjusted to correspond to the height of the aircraft cargo door. Once the bridge is positioned, it typically remains in a substantially constant position with respect to the aircraft, although it is known to make slight adjustments to the height of the bridge to compensate for shifts in the height of the aircraft cargo door as the plane is loaded or unloaded. Although the balance of the following discussion is presented in terms of a loading process in which cargo is placed onto an aircraft, it will be understood all concepts apply equally to unloading processes.

The second platform, hereinafter referred to as the platform, cycles up and down during the loading process, delivering cargo to the bridge. The platform is typically raised and lowered by means of hydraulic systems acting through mechanical linkages that ensure that the platform maintains a substantially horizontal attitude. For example, a pair of chains powered by hydraulic cylinders may cooperate with a platform squaring or stabilizing scissors to ensure that the platform moves vertically during raising and lowering. Cargo loaders of this type are known in the art.

The decks of the platform and bridge sections of cargo loaders are typically provided with an array of some type of friction-reducing device, so that containers and pallets can be easily slidably moved across the deck. In addition, the decks are provided with one or more powered devices for applying a motive force to the cargo. The powered devices may be wheels, rollers, belts or the like. Because of the nature of the loading process, which may entail lateral, longitudinal and rotational movement, the friction reducing devices on the surface rotate in whichever direction is required to achieve the desired movement, or at least not impede the desired movement. Thus, suitable friction reducing devices may be casters, rollers, wheels, or some combination thereof, and may be actuable in and out of engagement with the underside(s) of the cargo. One type of friction reducing device that is known for such omni-directional applications is a roller wheel, which essentially comprises a wheel hub having an axis and a plurality of peripheral rollers, with the peripheral rollers rotating about individual axes that are normal to the axis of the hub. A roller wheel may be mounted on a shaft which is rotated selectively in either rotational direction. In addition, roller wheels are known in which peripheral rollers are mounted on the hub in two rows, with the peripheral rollers in one row being staggered from the peripheral rollers in another row. Staggering the rollers relative to each other provides for constant contact of at least one peripheral roller of one of the wheels with a load-bearing surface at all times. Examples of roller wheels can be found in U.S. Pat. Nos. Des. 309,254, 318,791, U.S. Pat. Nos. 1,305,535 and 3,465,843. A complex roller assembly is disclosed in U.S. Pat. No. 4,223,753.

A significant problem with conventional roller wheels, and particularly dual hub roller wheels, is that the monolithic wheel hub is provided with a central bore for receiving the axle, which rotates with the wheel hub about the hub axis. This means that any installation, removal, repair or replacement of a roller wheel requires access to one end of the axle and requires that removal of the roller wheel from the axle be accomplished by sliding the roller wheel axially along the axle until it reaches and slides off the end of the axle. This type of access to the roller wheels may be acceptable during initial assembly, or in instances where the axle length is not great. However, in circumstances where the roller wheel is part of a complex assembly, or where the axle itself is relatively long, the need to remove a roller wheel from the axle in this manner becomes undesirable. An undesirable amount of disassembly and associated labor are thus expended replacing worn roller wheels and reinstalling new or refurbished roller wheels. The burden is particularly great when several roller wheels are mounted on a single axis, as it necessitates removal and subsequent replacement of all roller wheels between the defective wheel and the axle end.

Hence, it is desired to provide a roller wheel that can be quickly and easily installed on a drive axle without requiring access to the axle end. The desired roller wheel should also be durable and able to withstand the severe loading involved in cargo transfer.

SUMMARY OF THE INVENTION

The present invention provides a roller wheel that may be quickly and easily installed on an axle without requiring access to the axle end. The roller wheel is also durable and may be designed to withstand the severe loading involved in cargo transfer. The roller wheel comprises a split wheel hub that supports a plurality of peripheral rollers. In a preferred embodiment, the hub comprises two asymmetric hub halves that may be fastened together about an axle. The halves are held together by spanning rollers and bolts passing through aligned holes in flanges in the hub halves.

A first plurality of peripheral rollers are rotatably mounted in one row about the periphery of the hub, and a second plurality of peripheral rollers are similarly mounted in another row about the periphery of the hub. Each of the second plurality of rollers is spaced along the hub axis from the first plurality of rollers, and is circumferentially spaced between a pair of the first plurality of rollers.

In a preferred embodiment, a plurality of first roller support brackets are fixedly secured to the split wheel hub, and a first plurality of roller shafts extend between a pair of first roller brackets for supporting a corresponding one of the first plurality of peripheral rollers. At least one of the first plurality of roller shafts extend between a first roller bracket fixed to the first hub part and a first roller bracket fixed to the second hub part. A plurality of second roller brackets are similarly fixed to the split wheel hub, and a second plurality of roller shafts are similarly positioned between a pair of second roller brackets for supporting a second plurality of rollers. The first and second hub parts may each be unitary and substantially identical hub parts, and the second hub part may be inverted on the shaft with respect to the first hub part. The hub may include a front face panel positioned within a plane substantially perpendicular to the hub axis and a rear face panel positioned within another plane perpendicular to the hub axis. A medial panel may be spaced opposite the front hub panel with respect to the first plurality of rollers and opposite the rear face panel with respect to the second plurality of rollers. In a preferred embodiment, each of the rollers may be provided with an axis of rotation which is substantially perpendicular to the hub axis, and the roller wheel assembly may include at least four circumferentially spaced first rollers in the first row, and four circumferentially spaced second rollers in the second row.

It is an object of the present invention to provide an improved roller wheel assembly of the type having a first plurality of peripheral rollers and a second plurality of peripheral rollers. The roller wheel assembly includes a split wheel hub having at least first and second hub parts and fasteners for securing the first and second hub parts together.

It is another object of the invention to provide an improved method for assembling a roller wheel assembly on a shaft by forming first and second hub parts, fitting the first and second hub parts about the shaft, securing the first and second hub parts together about the shaft such that the assembled hub parts fully encircle the shaft, and thereafter rotatably mounting at least one of the first plurality of peripheral rollers and at least one of the second plurality of peripheral rollers about the periphery of the assembled hub parts.

It is a feature of the present invention that the roller wheel assembly may be part of a drive assembly for moving goods relative to a supporting surface, with the drive assembly including a plurality of powered axles each selectively rotatable relative to the supporting surface, and a plurality of roller wheel assemblies each mounted on a respective powered axle.

It is another feature of the invention that the roller wheel assembly includes a plurality of rollers in a first row and a plurality of rollers in a second row, with at least one of the rollers in each row being mounted on a roller shaft which extends between brackets affixed to the first and second hub parts.

A related feature of the invention is the first and second hub parts are preferably uniform and structurally substantially identical, such that one sub part may be inverted in the roller wheel assembly with respect to the other hub part.

It is a significant advantage of the present invention that the cost and the time required to replace the roller wheel assembly on an axle is significantly reduced by providing a split wheel hub having first and second hub parts. The strength of the split wheel hub nevertheless is maintained by interconnecting the hub parts with both conventional fasteners and at least one roller shaft in each of the first and second roller rows.

These and further objects, features and advantages of the present invention will become apparent from the following detailed description, wherein reference is made to the figures in the accompanying drawings.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

Figure 1:
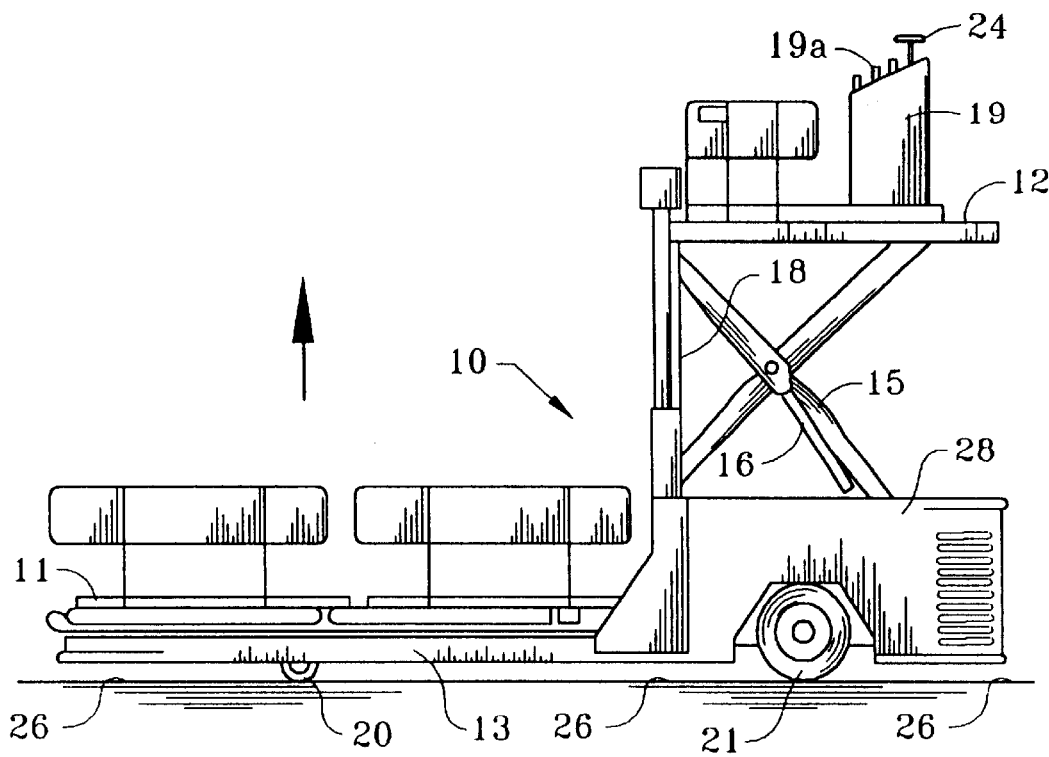
FIG. 1 shows a typical cargo loader with its bridge raised and its platform lowered.
Figure 2:
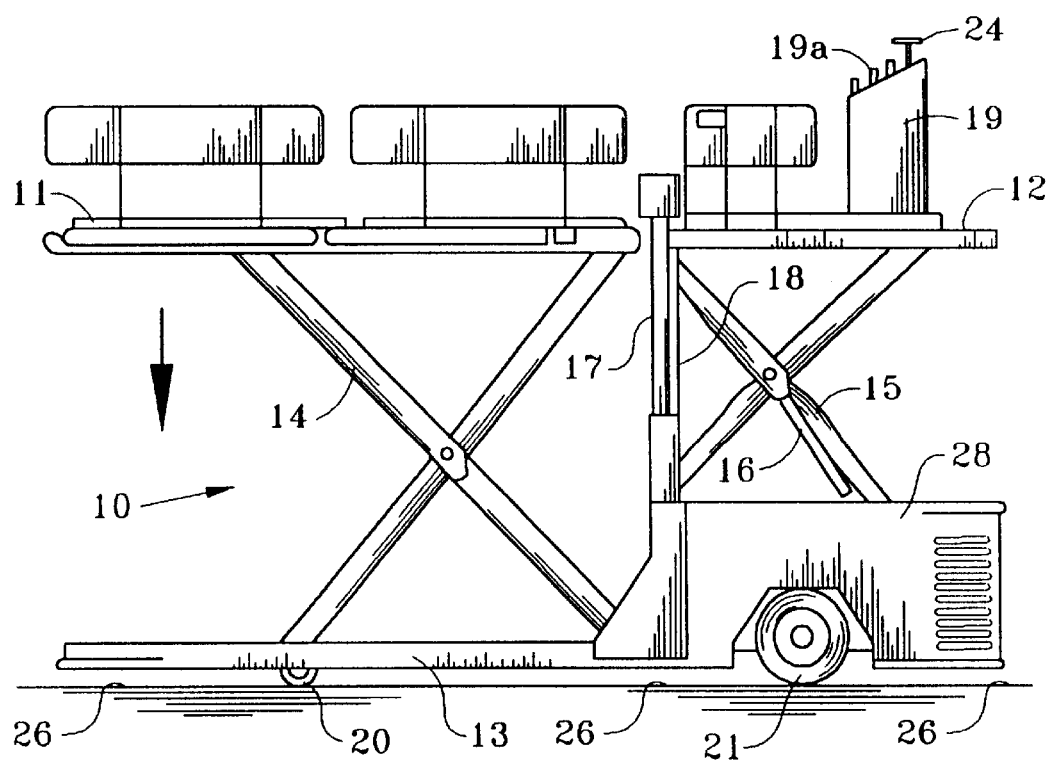
FIG. 2 shows the cargo loader of FIG. 1 with its platform raised t the level of the bridge.

Referring initially to FIGS. 1 and 2, a typical cargo loader 10 includes a loading/unloadng platform 11, bridge 12, chassis 13 and scissors 14. Platform 11 is supported and maintained in a level attitude with respect to chassis 13 by a scissors 14. Bridge 12 is similarly supported on a second scissors 15, which is raised and lowered by a pair of hydraulic rams 16. Platform 11 is raised by means of a hydraulic lift 17 and leaf chains 18, with each chain being secured to platform 11 at one end and to chassis 13 at the other end. Attached to the bridge 12 is a control station 19 that includes a control panel 19a. The chassis 13 is supported on four wheels, of which the rear pair 20 are free-wheeling and the front pair 21 are connected to steering and drive mechanisms (not shown). Control station 19 further includes a steering wheel 24 linked to the front wheels 21 for controlling and steering the loader. Mounted on the front of the chassis 13 is a housing 28 in which batteries (not shown), a motor/generator means (not shown) and associated transmission means (not shown) etc. are housed.

Figure 3:
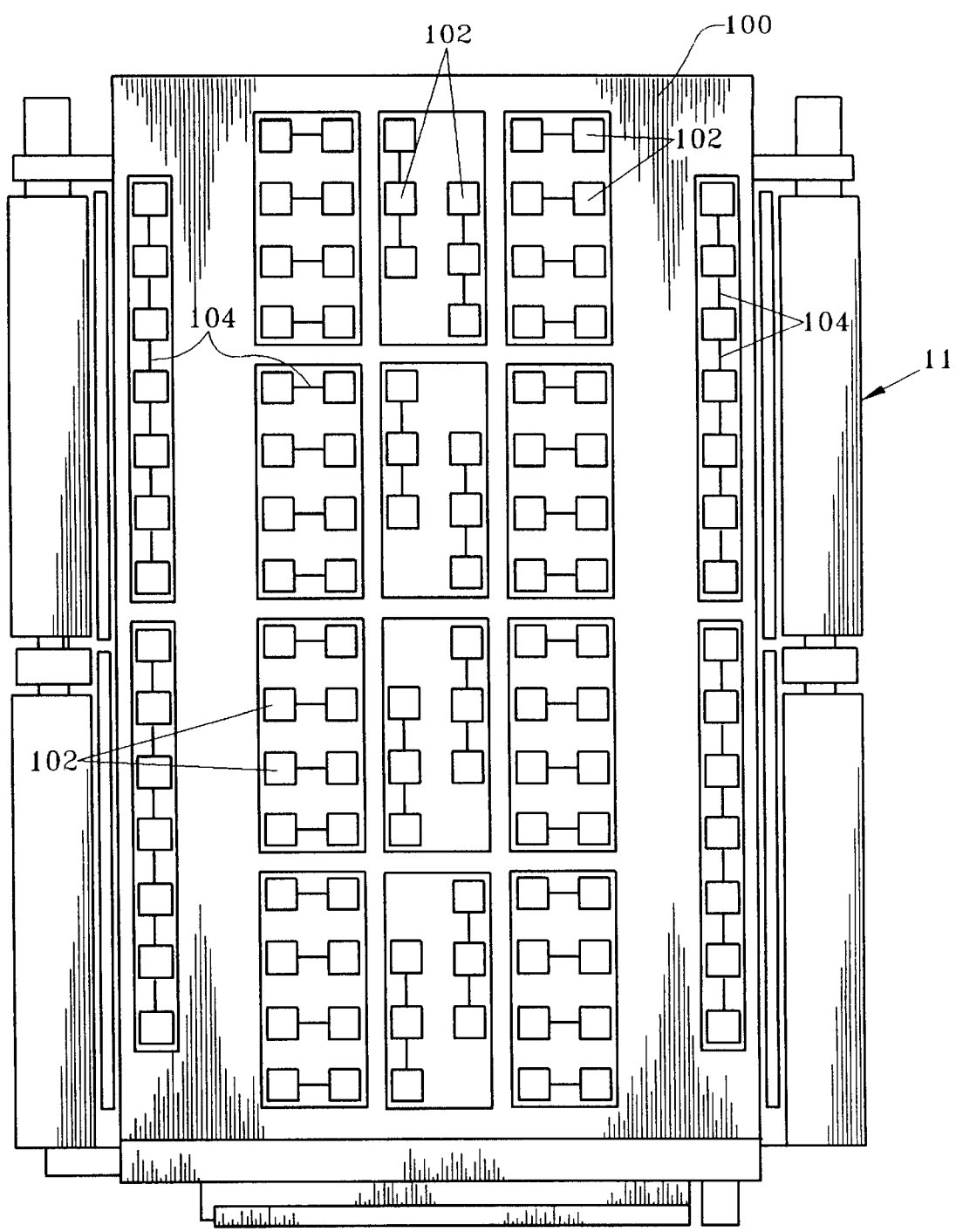
FIG. 3 is a partially schematic plan view of the platform of a loader constructed in accordance with the present invention.

Referring now to FIG. 3, a plan view of the platform deck 100 shows an array of roller wheels, schematically shown as boxes 102. The short lines or axles 104 connecting adjacent boxes 102 represent the axles on which the wheel hubs of those roller wheels are mounted. It can be seen that in many instances more than two wheels share an axle, and that on the sides of the platform, as many as seven roller wheels are mounted on a single axle. According to prior art techniques, when a wheel in the middle of one of these sets requires replacement, it is necessary to remove all of the wheels between the defective wheel and the end of the axle so as to slide the defective wheel off the axle.

Figure 4:
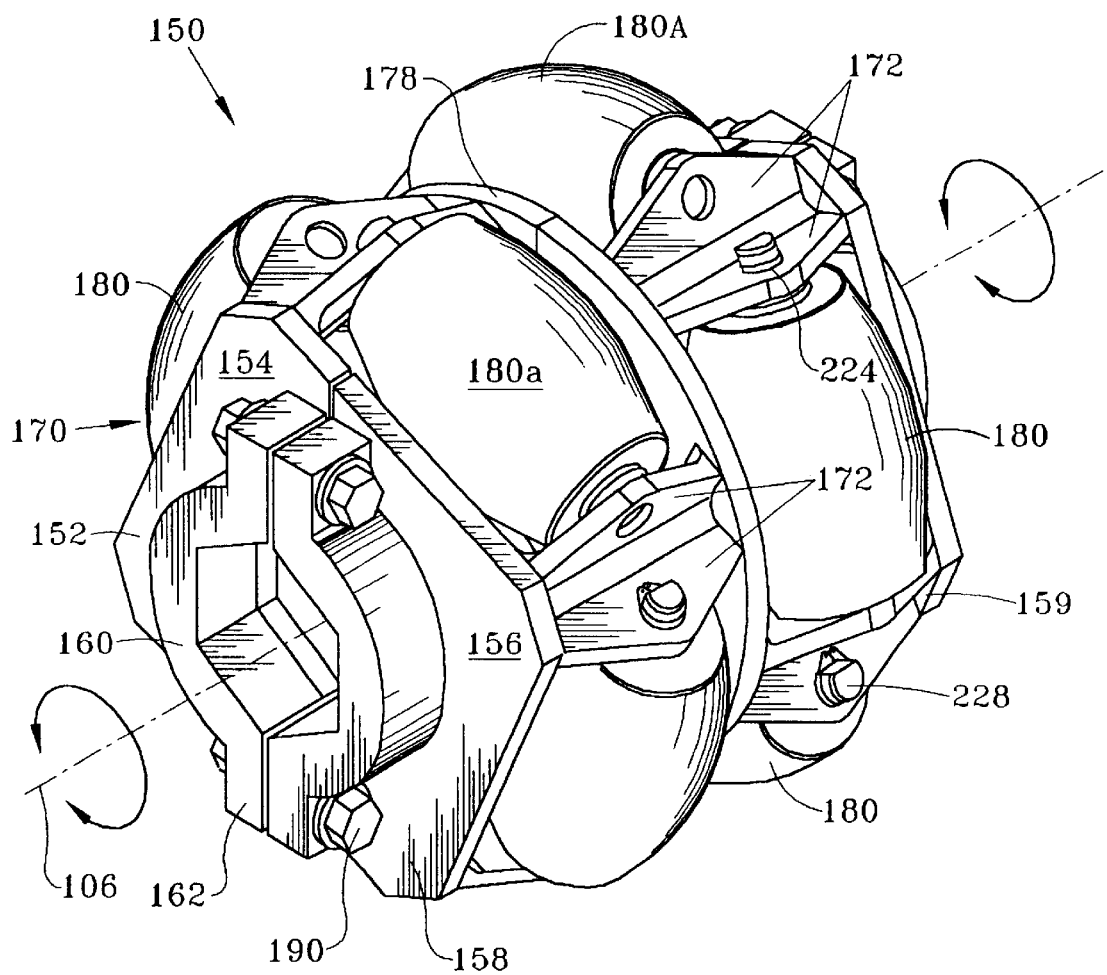
FIG. 4 is a perspective view of a split roller wheel in accordance with the present invention.
Figure 5:
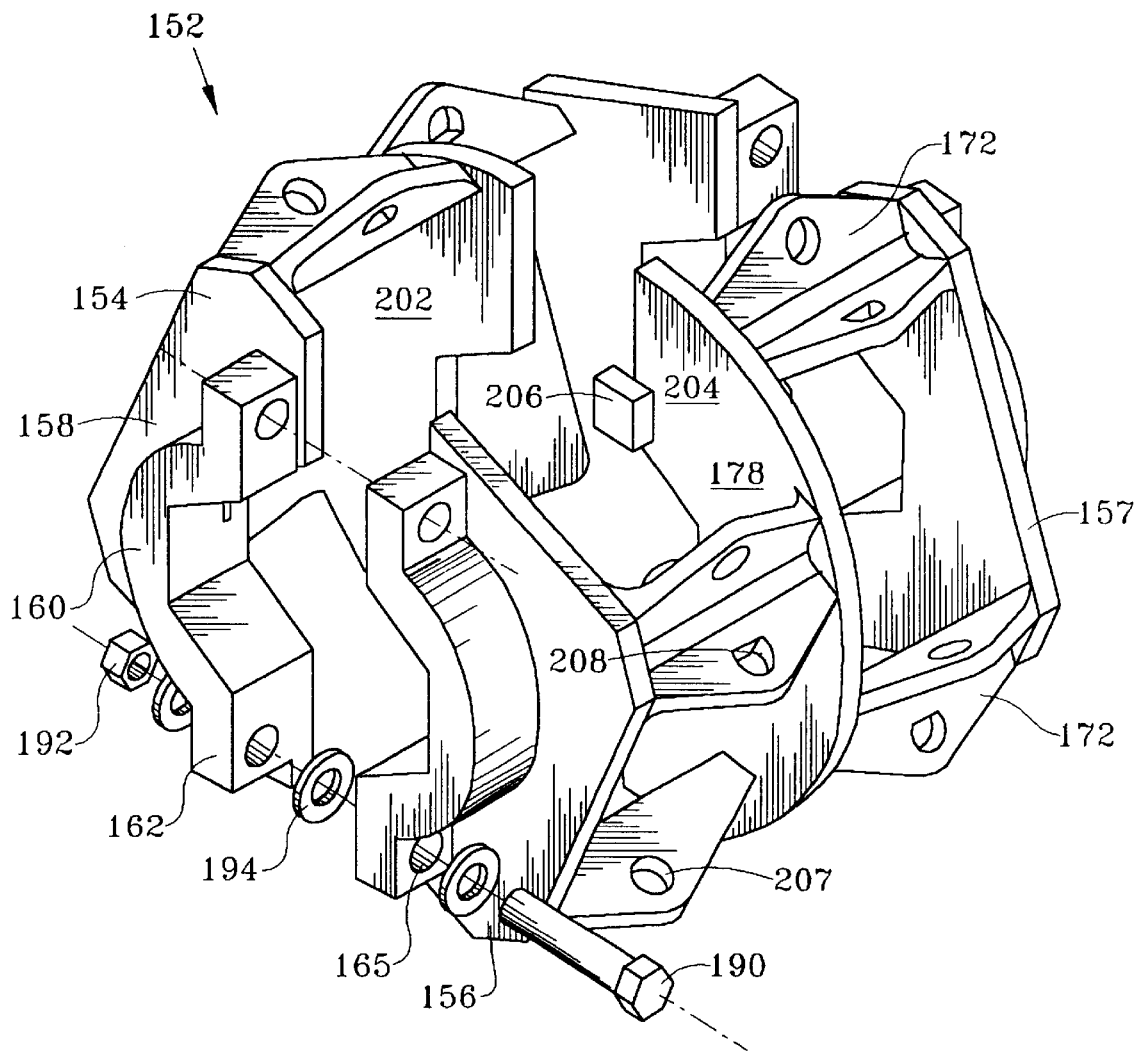
FIG. 5 is a perspective view of the split hub shown in FIG. 4.

Referring now to FIGS. 4–8, according to a preferred embodiment a split roller wheel 150 constructed in accordance with the present invention comprises a wheel hub 152 and a plurality of peripheral rollers 180 mounted thereon. As best illustrated in FIG. 5, hub 152 is constructed in two halves 154, 156. It has been found that halves 154, 156 can be formed as identical, asymmetrical pieces as described in detail below such that when one piece is inverted with respect to the other and the halves are fastened together, a single hub is formed that has a hub axis of rotation 106. The assembled hub 152 is capable of supporting two peripheral sets of rollers in two rows, i.e., a front row and a rear row each comprising a plurality of circumferentially spaced rollers 180. Furthermore, this configuration allows the respective sets of rollers to be staggered, so as to provide a more continuous or even support surface as the wheel rotates about the hub axis.

In particular, each hub half includes a substantially planar front face panel portion 158, a substantially planar rear panel portion 159, a pair of sleeve halves 160, a pair of roller-support sections 170, and a medial panel portion 178. Sleeve halves 160 each extend axially from the front and rear face panels 158, 159. Sleeve halves 160 preferably each include a pair of flanges 162 that include bolt holes 165 (FIG. 5) therethrough. Roller support sections 170 extend between front face panels 158 and medial panel 178 and between rear face panel 159 and medial panel 178. The roller support sections each include a plurality of brackets 172 that are paired to support rollers 180 therebetween. Rollers are preferably held in place by a respective roller shaft 228 extending through a pair of brackets 172. Each of the brackets 172 thus is fixed to both the medial panel 178 and either the front panel 158 or the rear panel 159. In one preferred embodiment, four rollers are supported on each side of hub 152, with the result that adjacent pairs of brackets 172 are substantially perpendicular.

Figure 7:
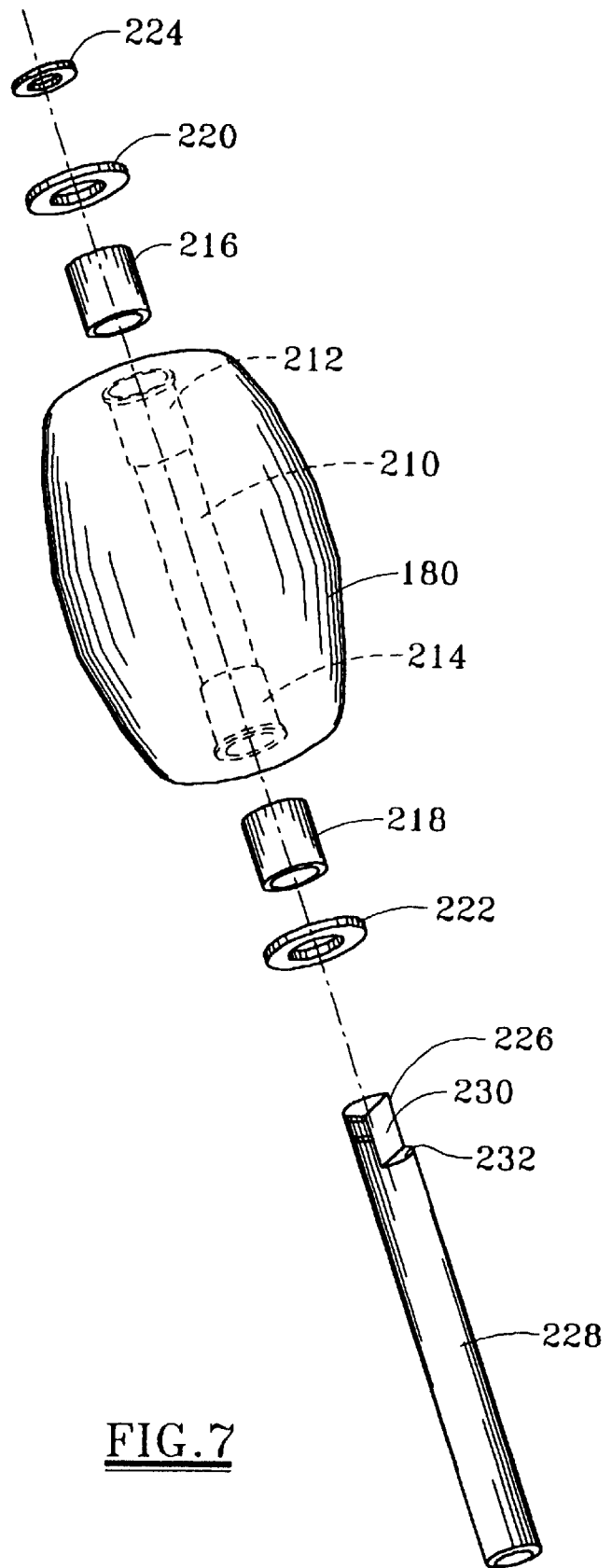
FIG. 7 is an exploded view of a roller assembly as shown in FIG. 4.

The rollers 180 may each be mounted on a respective shaft 228 as shown in FIG. 7 that does not rotate with respect to its respective supporting brackets 172. Instead, bearing sleeves 212, 218 are provided between the inner surface of each roller and its shaft to provide the wear surface for roller rotation. The roller shafts may thus each be mounted in brackets 172 in a manner that precludes relative rotation.

Figure 6:
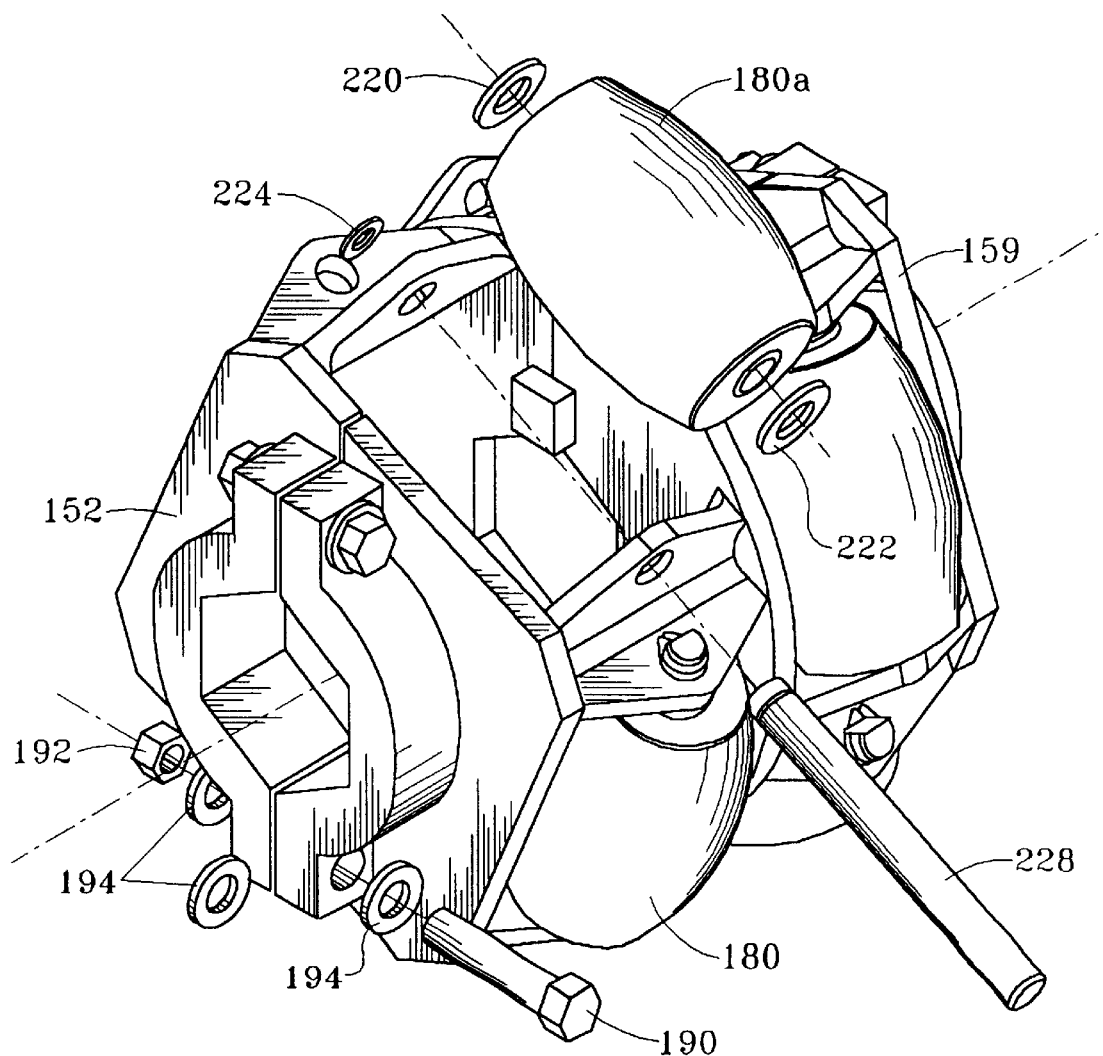
FIG. 6 is a perspective view of a partially assembled split roller wheel.

It can be seen that the positioning of brackets 172 on either side of medial panel 178 is not symmetric and results in the rollers 180 being staggered. As best shown in FIGS. 4 and 6, it is preferred that one roller 180a span the interface between the hub halves 154, 156 on each side of hub 152 and on opposite sides of wheel 150. Thus, there are four spanning rollers 180a in the embodiment shown in FIGS. 4–8, one visible in the front row on top, one visible in the rear row on top, one not visible in FIG. 4 in the front row on the bottom, and one not visible in the rear row on the bottom. Bolt holes 165 as shown in FIG. 5 on the bottom on the two hub halves align so that bolts 190 may be passed therethrough, with each bolt being secured by a conventional nut 192 and one or more flat and/or lock washers 194. It is preferred but not necessary to use both spanning rollers and bolts to fasten the hub halves together, so as to achieve a solid and durable roller wheel.

From the foregoing, it will be understood that roller wheel 150 is mounted on a selected axle 104 by separating the two hub halves 154, 156 from each other. This is accomplished by detaching each of the four spanning rollers from one hub half and removing the bolts from bolt holes 165. Each roller 180 is detached from the hub by removing the roller shaft 228. To mount wheel 150 on an axle 164, hub halves 154, 156 are fit around the axle and fastened together. The halves are fastened together by replacing and tightening the bolts 190 and nuts 192 and attaching the four spanning rollers 180a at the interface between the attached hub halves. The other four rollers 180 are not affected by the foregoing process. To remove roller wheel 150 from the axle, the halves are separated by removing the bolts and detaching the spanning rollers 180a.

Referring to FIGS. 5 and 6, it may be seen that the front panel portions 158 of the first and second hub halves together form a substantially planar front panel which lies in a plane perpendicular to the hub axis 106, and that the rear panel portions 159 of each hub half form a similar planar rear panel which is also perpendicular to the hub axis 106. It should be understood that terms "front" and "rear" as used herein are not intended in a limiting sense and are instead broadly used to distinguish components which are spaced along the axis 106 of the hub 152, and thus are spaced along the axis of the axle on which the hub 152 is mounted. FIG. 5 similarly depicts that the medial panel 178 is composed of medial panel portion 202 affixed to one of the hub halves, and a similar panel 204 affixed to the other sub half. A stop 206 may be fixed to each medial panel portion, and serves to assure that the medial panel portions 202 and 204 are properly positioned during assembly of the hub halves about the axle. FIG. 5 also depicts that the pair of brackets for supporting each roller in the first and second rows may include one bracket in the pair having an aperture 207 which has a circular configuration, and a corresponding bracket with an aperture 208 which has a flat for preventing rotation of the shaft 228 with respect to the brackets. Referring briefly to FIG. 7, the roller shaft 228 has a flat portion 230 on one end for fitting within the aperture 208, and accordingly the roller shaft 228 may be installed only in one direction between a pair of roller brackets.

The method of the present invention may be described with respect to FIGS. 5 and 6. The first and second hub parts shown in FIG. 5 may be formed, and two rollers 180 may be mounted on each of the hub parts. The first and second hub parts with the four rollers mounted thereon may then be fitted about a respective axle 104, and the hub parts secured together about the axle with the bolts 190 passing through the apertures in the front and rear flanges of the hub parts. Accordingly, the assembled first and second hub parts fully encircle the axle 104, and the assembled hub is fixedly mounted to a respective axle. Thereafter, four rollers 180a may be rotatably mounted between each of the pair of brackets which do not yet support a roller. Referring to FIG. 7, end bushings 216, 218 may first be positioned within the enlarged cavities 212 and 214 at the ends of the central passageway 210 in each roller 180. Flat washers 220 and 222 reduce wear between end faces of the roller 180 and the supporting brackets. Once the bushings or bearing members 216 and 218 are positioned within a roller 180, the flat washers 220 and 222 may be temporarily adhered to the end face for a roller using a small amount of grease. The rollers and flattened washers may then be positioned between a pair of brackets, and the roller shaft 228 inserted through the round hole 207, through the flat washer 222 and the passageway 210 in the roller 180, through the second flat washer 220, then through the hole 208 with the flat thereon. The flat 230 on the roller shaft is thus aligned with the corresponding flat in the hole 208 in order that the shaft 228 may be positioned in place. The end face 232 on the shaft 228 limits further insertion of the shaft 228. A conventional snap ring 224 may then be snapped into the groove 226 provided on the shaft 228, thereby securing the shaft 228 and the roller 180 in place.

Figure 8:
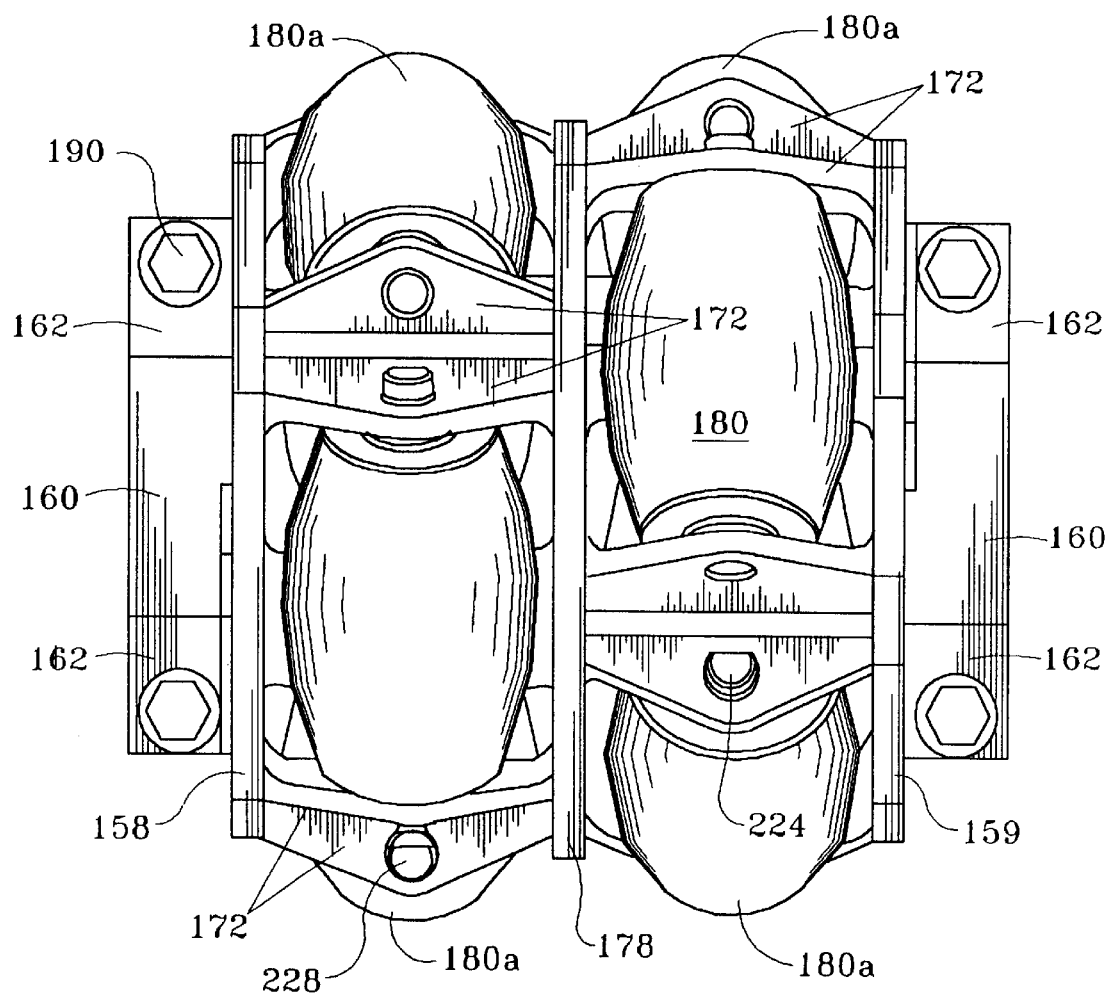
FIG. 8 is a side elevation of the split roller wheel shown in FIG. 4.

In this manner, the top roller 180 in the front row may thus be installed in the roller wheel as shown in FIG. 6, and then a similar roller 180 installed in the rear row. Each of these rollers 180 is installed after the hub parts fitted about the shaft, since the rollers 180 span the split between the two roller halves. The axle 104 may then be rotated and similar rollers 180 installed between the two brackets which still do not have rollers mounted thereon. Two rollers 180a will thus be mounted in the first row and two rollers 180a will similarly be mounted in the second row. FIG. 8 thus depicts a side view of the completely assembled wheel 150 according to the present invention.

It will be understood from the foregoing that the present split roller wheel greatly simplifies assembly, disassembly of the platform deck components and repair and replacement of individual roller wheels. The present split roller wheel may be removed from its axle and replaced without the need to loosen or remove any adjacent equipment or slide the wheel along the axle. In addition, because each split roller wheel is assembled from identical halves, inventory and parts costs can be minimized. By way of example only, if a single roller mounting bracket on a roller wheel becomes damaged, it is possible that the wheel may be repaired by replacing only one hub part of the wheel. Because of the amount of material and labor involved in manufacturing a single hub part, significant cost savings are realized when portions of a defective roller wheel can be salvaged.

In operation, split roller wheel 150 is affixed to a rotatable axle 104 as part of a generally planar array of similar friction reducing devices. As cargo is moved across the array, it engages rollers 180 of each split wheel 150, causing rotation of rollers 180, wheel 150, or both.

The split wheel of the present invention is well suited for use as part of a drive assembly for moving goods relative to a supporting surface. As discussed above, the drive assembly conventionally includes a plurality of powered axles each selectively rotatable relative to a supporting surface, and a plurality of roller wheel assemblies each mounted on a respective powered axle. The drive wheel assembly may thus be part of the platform or part of the bridge for a cargo loader, as described herein. Each of the axles of the platform or bridge may be selectively powered to move or rotate pallets about the platform or bridge. Alternatively, the split wheels as disclosed herein may be used as part of the drive assembly for a supporting surface on either a platform dolly or a transporter. A platform dolly is a trailer which is conventionally used to transport pallets from a storage area to a cargo loader as disclosed herein, or to transport pallets from the cargo loader to a storage area. A transporter is a similar device, although generally a transporter includes the components for powering the transporter between the cargo loader and the storage area. Also, the roller wheel assembly of the present invention may be used as part of a freight handling system of the type commonly used in warehouse storage areas.

The particular roller wheel assembly as disclosed herein has four rollers circumferentially mounted in a first row and four rollers circumferentially mounted in a second row with each of the rollers in the second row being staggered and thus spaced between a pair of rollers in the first row. Those skilled in the art will appreciate that additional rollers may be provided in each of the first and second rows, and that an alternate embodiment of a roller assembly may comprise six rollers in the first row and six staggered rollers in the second row. Also, the split wheel assembly may include one or more rows of rollers in addition to the two rows discussed herein. The roller wheel assembly as specifically disclosed herein includes a plurality of roller shafts which are each fixedly secured to the split wheel hub, with each roller rotating about a respective roller shaft. In alternate embodiments, both the roller shafts and the corresponding rollers may rotate about a roller shaft axis with respect to the split wheel hub. Each of the axes of rotation of the rollers in the first and second rows as disclosed herein are substantially perpendicular to and are spaced from the hub axis, although in alternate embodiments each roller axis may be canted with respect to the roller axis as shown herein.

Each first and second hub parts may be cast as a unitary structure, and one hub part inverted with respect to the other hub part. In alternate embodiments, the first and second hub parts may be formed by other techniques, such as welding. The hub parts are preferably structurally substantially identical, although different first and second hub parts less desirably could be formed. A combination of the front face panel, the rear face panel, the medial panel as disclosed herein provides the desired structural rigidity to the hub, although alternate configurations of the split hub are possible. In another embodiment, the split hub could comprise more than two circumferentially spaced hub parts. Alternate arrangements will be suggested in view of the above disclosure for mounting each of the rollers with respect to the hub. In yet another embodiment, the split hub of the present invention could be rotatably mounted on an axle rather than be fixedly mounted on the axle, and in this case a split bearing may be used to rotatably mount the split hub to the axle.

While preferred embodiments of this invention have been shown and described, modifications thereof can be made by one skilled in the art without the departing from the spirit or teaching of this invention. The embodiments described herein are exemplary only and are not limiting. Many variations and modifications of the system and apparatus are possible and are within the scope of the invention. For example, the number of peripheral rollers and the number of sets of rollers can be varied. Similarly, the number of pieces from which a complete roller wheel is assembled may be varied, as can the manner of attachment of the pieces of each other. Accordingly, the scope of the protection is not limited to the embodiments described herein, but is only limited by the claims which follow, the scope of which shall include all equivalents of the subject matter of the claims.

What is claimed is:

1. A roller wheel assembly for rotation with an axle having an out-of-round cross section, comprising:

a split wheel hub having at least first and second split hub parts each having inner faces which, when disposed about the axle, provide an out-of-round opening conforming to the axle for rotating therewith about a hub axis of rotation;

fasteners for releasably connecting said hub parts together, when their inner faces are disposed about the axle, whereby the hub parts rotate with the axle and the hub parts are free to be removed from the axle upon release of the fasteners;

a first plurality of peripheral rollers rotatably mounted about the periphery of each said first and second hub parts, each of the first plurality of peripheral rollers having an axis or rotation spaced perpendicular to and radially from the said hub axis of rotation;

a second plurality of peripheral rollers rotatably mounted about the periphery of each said first and second hub parts, each of said second plurality of rollers having an axis of rotation perpendicular to and spaced radially from the said hub axis of rotation;

each of said second plurality of rollers being spaced along said hub axis from the said first plurality of rollers, and each of said second plurality of rollers being offset circumferentially between a pair of said first plurality of roller.

2. The roller wheel assembly as defined in claim 1, further comprising:
- a plurality of first roller support brackets each fixedly secured to said first part of said split wheel hub;
- a first plurality of roller shafts each extending between a pair of said first plurality of roller brackets and supporting a corresponding one of said first plurality of peripheral rollers,
- at least one of said first plurality of roller shafts extending between a first roller bracket fixed to said first hub part and a first roller bracket fixed to said second hub part;
- a plurality of second roller brackets each fixedly secured to said split wheel hub; and
- a second plurality of roller shafts each positioned between a pair of said second plurality of roller brackets and supporting a corresponding one of said second plurality of peripheral rollers,
- at least one of said second plurality of roller shafts extending between a second roller bracket fixed to said first hub part and a second roller bracket fixed to said second hub part.

3. The roller wheel assembly as defined in claim 2, wherein each of said first and second plurality of rollers is rotatably mounted on a respective roller shaft supported by said split wheel hub.

4. The roller wheel assembly as defined in claim 1, wherein each of said first and second hub parts include a first hub part and a second hub part, second hub part being structurally substantially identical to said first hub part and inverted in said roller wheel side for side assembly with respect to said first hub part.

5. The roller wheel assembly as defined in claim 1, wherein said split wheel hub comprises:
- a front face panel positioned substantially perpendicular to said hub axis;
- a rear face panel positioned substantially perpendicular to said hub axis; and
- a medial panel spaced opposite said front panel with respect to said first plurality of rollers and opposite said rear face panel with respect to said second plurality of rollers.

6. The roller wheel assembly as defined in claim 5, wherein said medial panel comprises:
- a first medial panel portion fixedly secured to said first hub part; and
- a second medial panel portion fixedly secured to said second hub part.

7. The roller assembly as defined in claim 5, wherein said split wheel hub further comprises:
- a front flange extending along said hub axis from said front face panel; and
- a rear flange extending along said hub axis from said rear face panel.

8. The roller wheel assembly defined in claim 1, wherein said first axis of rotation and said second axis of rotation are each substantially perpendicular to said hub axis.

9. The roller wheel assembly as defined in claim 1, wherein said first plurality of peripheral rollers include at least four circumferentially spaced first rollers, and wherein said second plurality of rollers include at least four circumferentially spaced second rollers.

10. The roller wheel assembly as defined in claim 1, further comprising:
- a plurality of first roller support brackets each fixedly secured to said split wheel hub part;
- a first plurality of roller shafts each positioned between a pair of said first plurality of roller brackets and supporting a corresponding one of said first plurality of peripheral rollers;
- a plurality of second roller brackets each fixedly secured to said split wheel hub, and
- a second plurality of roller shafts each positioned between a pair of said second plurality of roller brackets and supporting a corresponding one of said second plurality of peripheral rollers.

* * * * *